US012659275B2

(12) United States Patent (10) Patent No.: US 12,659,275 B2
Shakir et al. (45) Date of Patent: Jun. 16, 2026

(54) DISTRIBUTED SOFTWARE DEFINED NETWORK ARCHITECTURE

(71) Applicant: Google LLC, Mountain View, CA (US)

(72) Inventors: Robert Shakir, San Francisco, CA (US); Sylvia Ratnasamy, Berkeley, CA (US); Jayaram Mudigonda, Mountain View, CA (US); Ashok Narayanan, Lexington, MA (US); Alexander Krentsel, Berkeley, CA (US)

(73) Assignee: Google LLC, Mountain View, CA (US)

( * ) Notice: Subject to any disclaimer, the term of this patent is extended or adjusted under 35 U.S.C. 154(b) by 488 days.

(21) Appl. No.: 18/109,654

(22) Filed: Feb. 14, 2023

(65) Prior Publication Data

US 2024/0275723 A1 Aug. 15, 2024

(51) Int. Cl.
H04L 45/76 (2022.01)
H04L 41/122 (2022.01)
(52) U.S. Cl.
CPC ............ H04L 45/76 (2022.05); H04L 41/122 (2022.05)
(58) Field of Classification Search
CPC ........ H04L 41/12; H04L 41/122; H04L 45/76
See application file for complete search history.

(56) References Cited

U.S. PATENT DOCUMENTS 10,148,564 B2 12/2018 Wood et al.
10,263,848 B2 4/2019 Wolting
10,805,203 B2 10/2020 Wang et al.
10,893,095 B1 1/2021 Taaghol et al.
11,252,079 B2 2/2022 Michael et al.
11,330,087 B2 5/2022 Wouhaybi et al.
2012/0182867 A1* 7/2012 Farrag ........................ H04J 3/16
                                                      370/230
2014/0293805 A1* 10/2014 Khaldoun ............... H04L 41/32
                                                      370/252
2015/0244607 A1 8/2015 Han
2016/0254984 A1 9/2016 Tekalp et al.
2016/0337962 A1* 11/2016 Peng ................... H04L 41/0806
2018/0227224 A1* 8/2018 Bhaskar ................. H04L 45/38

(Continued)

OTHER PUBLICATIONS

Extended European Search Report for European Patent Application No. 23189642.4 dated Dec. 21, 2023. 19 pages.

(Continued)

*Primary Examiner* — Jeong S Park
(74) *Attorney, Agent, or Firm* — Lerner David LLP

(57) ABSTRACT

The present disclosure is a decentralized Software Defined Network (dSDN) which runs individual dSDN controllers at each router in the network, disseminating network state via an inter-router communication protocol. In some examples, the dSDN is an underlay and is coexistant with an out-of-band software defined network (SDN) control plane, thus achieving a unified architecture that applies across both overlay and underlay. In both the overlay and the underlay, path computation is based on global state, such as a complete view of a network connectivity graph and traffic demands. An end-to-end path that a packet takes may be determined by a localized computation that is run at a single node, such as an SDN controller in the overlay or a head-end router in the dSDN underlay. The network may be partitioned into domains and the same approach may be applied within and across domains.

20 Claims, 10 Drawing Sheets

(56)          References Cited

U.S. PATENT DOCUMENTS

| | | | | |
|---|---|---|---|---|
| 2019/0190819 | A1* | 6/2019 | Choudhury | ............. H04L 45/50 |
| 2019/0349286 | A1 | 11/2019 | Bruno et al. | |
| 2020/0344147 | A1* | 10/2020 | Pianigiani | ........... H04L 41/0806 |
| 2021/0111991 | A1 | 4/2021 | Vadera | |
| 2023/0044281 | A1* | 2/2023 | Shin | .................... H04L 63/1433 |
| 2023/0216736 | A1* | 7/2023 | Almadani | ............. H04L 41/082 |
| | | | | 709/224 |
| 2024/0119049 | A1* | 4/2024 | Bzoch | ............... G06F 16/24537 |

OTHER PUBLICATIONS

Zaicu et al. Helix Traffic Engineering for Multi-Controller Sdn. Proceedings of the 30th ACM International Conference on Multi-media, ACMPUB27, New York, NY, USA, Oct. 11, 2021 (Oct. 11, 2021), pp. 80-87.
Lakshminarayanan et al., Achieving Convergence-Free Routing Using Failure-Carrying Packets, 2007, 12 pages.

* cited by examiner

Receiving, at a first router in a network, a node state from each other router in the network                 610

Determining, based on the node states, a global view of the network                 620

Performing, by the first router, fully general path computation over the global view of the network                 630

Forwarding packets, using strict source routing, over the computed path                 640

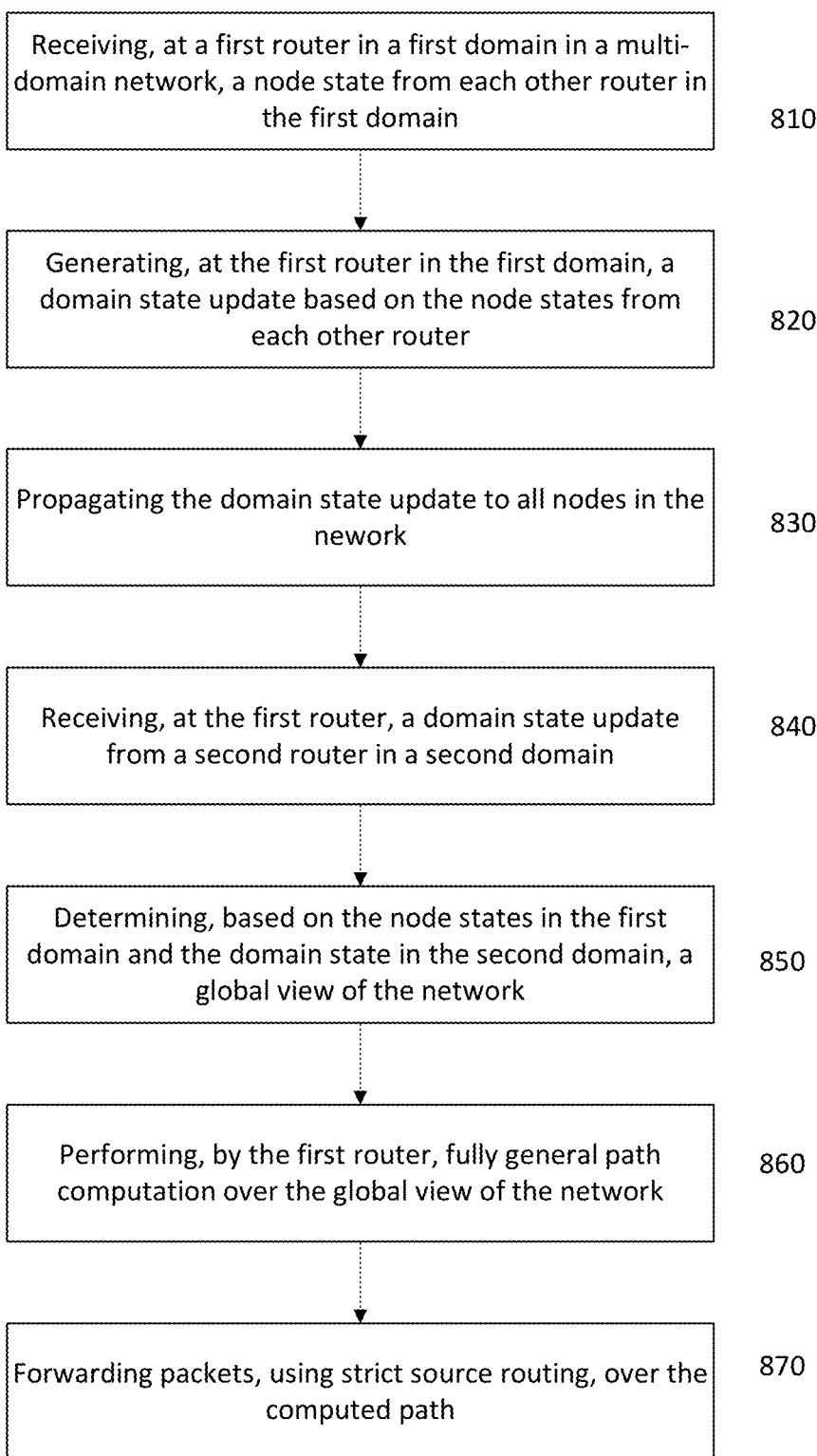

Receiving, at a first router in a first domain in a multi-domain network, a node state from each other router in the first domain — 810

Generating, at the first router in the first domain, a domain state update based on the node states from each other router — 820

Propagating the domain state update to all nodes in the nework — 830

Receiving, at the first router, a domain state update from a second router in a second domain — 840

Determining, based on the node states in the first domain and the domain state in the second domain, a global view of the network — 850

Performing, by the first router, fully general path computation over the global view of the network — 860

Forwarding packets, using strict source routing, over the computed path — 870

FIG. 8

DISTRIBUTED SOFTWARE DEFINED NETWORK ARCHITECTURE

BACKGROUND

Some networks, such as wide area networks (WANs) may include a network overlay and a network underlay. For example, the overlay may be based on a software defined network (SDN) architecture in which a logically centralized controller computes end-to-end paths based on a global view of the network's state and then directly programs these paths at each router via a control plane network. The underlay may be based on traditional routing protocols that run at network routers. Paths computed by the overlay's SDN controller may act as primary paths, while paths computed by the underlay may act as fallback paths used when the primary paths are unavailable.

Relying on traditional routing protocols in the network underlay can be problematic. For example, the network may inherit complexity such as distributed decision-making, bloated protocols, complex configuration, etc. It also increases the conceptual complexity that developers and operators face since they must now understand two disjoint control planes and have the ability to reason about potential interactions. Moreover, diagnostics and verification typically must be addressed separately for the overlay and the underlay.

Some examples of known routing protocols include IS-IS, failure-carrying packets (FCP), etc. IS-IS routing protocol is a link-state routing protocol in which routers exchange topology information with their nearest neighbor and the topology information is propagated through the system. In IS-IS, every router computes paths based on a global network view, however only the next-hop router is programmed into the forwarding plane. IS-IS is typically limited to relatively simple pathing algorithms. FCP proposes using source routing and annotating packets with information about failed links to avoid loops across source routes.

Given the complexity of network control planes, it can be difficult to ensure that the software systems used to compute paths are bug-free, despite extensive testing. One approach to ensure correctness is to validate the outputs of the path computation process. This is done by checking that certain invariants on path properties hold true. Examples of such invariants include: paths being free of loops, paths containing no dead ends, limiting a number of flows across a single link, avoiding specific geographic regions, etc. However, approaches based on output validation are typically not able to detect all bugs using the invariant checks. Moreover, validating the output of the SDN controller may miss errors in the process between computing paths at the SDN controller and programming these paths at each network router.

BRIEF SUMMARY

The present disclosure describes a decentralized Software Defined Network (dSDN) which runs individual dSDN controller servers at each router in the network, disseminating network state via an inter-node or inter-router communication protocol, such as a link-state protocol, etc.

A new architecture is provided in which a control plane runs at each node, in a manner that may coexist with an existing out-of-band SDN control plane, or act as the sole mechanism for network control plane. In some examples, the architecture may be implemented as an underlay with a SDN control plane overlay, thus achieving a unified architecture that applies across both overlay and underlay. For scalability, the network may be partitioned into domains and the same approach may be applied within and across domains.

The architecture powered by dSDN is made up of individual dSDN controllers responsible for controlling each of the routers in the network. In contrast to a traditional SDN architecture, in dSDN controller logic is replicated at each router node.

From the perspective of validation, the dSDN architecture described herein provides a unified approach to path computation in the overlay and underlay. Specifically, in both the overlay and the underlay, path computation is based on global state. For example, the path computation may be derived from a complete view of a network connectivity graph and optionally traffic demands. Moreover, in the absence of failures, an end-to-end path that a packet takes may be determined by a localized computation that is run at a single node, such as an SDN controller in the overlay or a head-end router in the dSDN underlay.

The present disclosure provides an approach to validating paths that: (i) has the ability to capture a wider range of bugs, (ii) requires no global snapshot or coordination across routers and, (iii) can be run locally at each router capturing errors at runtime. This approach is enabled by, and applicable to, networks based on dSDN architecture.

One aspect of the disclosure provides a system, comprising a plurality of routers in a network, each router having a decentralized software-defined networking (dSDN) controller. At least a first of the plurality of routers may be configured to receive a node state from each other router in the plurality of routers in the network, determine, based on the node states from each other router, a global view of the network, compute a first set of end-to-end paths over the global view of the network, and forward packets using strict source routing over the first set of end-to-end paths.

According to some examples, the system may further include a centralized software-defined networking (SDN) controller in an overlay of the network, the centralized SDN controller in communication with each of the plurality of routers in the network. In such examples, the centralized SDN controller may be configured to compute a second set of end-to-end paths over the network. For example, the dSDN controller of the first router may be configured to compare the first set of end-to-end paths with the second set of end-to-end paths, and determine, based on the comparing, whether errors exist in the first or second set of end-to-end paths. In some examples, the system may further include a verification server configured to receive the first set of end-to-end paths from the first router, receive the second set of end-to-end paths from the centralized SDN controller, compare the first set of end-to-end paths with the second set of end-to-end paths, and determine, based on the comparing, whether errors exist in the first or second set of end-to-end paths.

According to some examples, the network may be a multi-domain network wherein the first router is in the first domain and a second plurality of routers is in the second domain. In such example, the first router may be further configured to generate a first domain state based on the node states from each other router, and provide the first domain state to at least one second router in the second plurality of routers in the second domain. The first router may be further configured to receive a second domain state from the second domain, and generate the global network state based on the node states from the first domain and the second domain state from the second domain, wherein the first set of end-to-end paths includes inter-domain links. In forwarding

3 packets using strict source routing over the first set of end-to-end paths the first router may be further configured to determine whether a next-hop in a source route is unavailable, and replace the source route with a different source route using an available neighbor.

In some examples, determining the global view of the network may include constructing a topology graph using the node states. Computing the first set of end-to-end paths may include processing the topology graph to compute routes that are compliant with one or more policies.

Another aspect of the disclosure provides a method of routing among a plurality of routers in a network, each router having a decentralized software-defined networking (dSDN) controller. The method may include receiving, at a first router of the plurality of routers, a node state from each other router in the plurality of routers in the network. The method may further include determining, by a decentralized software-defined networking (dSDN) controller at the first router based on the node states from each other router, a global view of the network, computing, by the dSDN controller, a first set of end-to-end paths over the global view of the network, and forwarding packets using strict source routing over the first set of end-to-end paths.

According to some examples, the method may further include determining, by a centralized software-defined networking (SDN) controller in an overlay of the network, a topology of the network. It may further include computing, by the centralized SDN controller, a second set of end-to-end paths over the network. It may further include comparing, by the dSDN controller of the first router, the first set of end-to-end paths with the second set of end-to-end paths, and determining, based on the comparing, whether errors exist in the first or second set of end-to-end paths. According to some examples the method may further include receiving, at a verification server, the first set of end-to-end paths from the first router, receiving, at the verification server, the second set of end-to-end paths from the centralized SDN controller, comparing, at the verification server, the first set of end-to-end paths with the second set of end-to-end paths, and determining, at the verification server based on the comparing whether errors exist in the first or second set of end-to-end paths.

According to some examples, the network may be a multi-domain network wherein the first router is in the first domain and a second plurality of routers is in the second domain. In such examples, the method may further include generating, by the first router in the first domain, a first domain state based on the node states from each other router, and providing the first domain state to at least one second router in the second plurality of routers in the second domain. Further, the method may include receiving, by the first router in the first domain, a second domain state from the second domain, and generating the global network state based on the node states from the first domain and the second domain state from the second domain, wherein the first set of end-to-end paths includes inter-domain links.

According to some examples, forwarding the packets using strict source routing over the first set of end-to-end paths may include determining whether a next-hop in a source route is unavailable, and replacing the source route with a different source route using an available neighbor.

According to some examples, determining the global view of the network may include constructing a topology graph using the node states. In such examples, computing the first set of end-to-end paths may include processing the topology graph to compute routes that are complaint with one or more policies.

4
BRIEF DESCRIPTION OF THE DRAWINGS

FIG. 8 is a flow diagram illustrating an example method of packet forwarding in a multi-domain dSDN network according to aspects of the disclosure.

DETAILED DESCRIPTION

Figure 1:
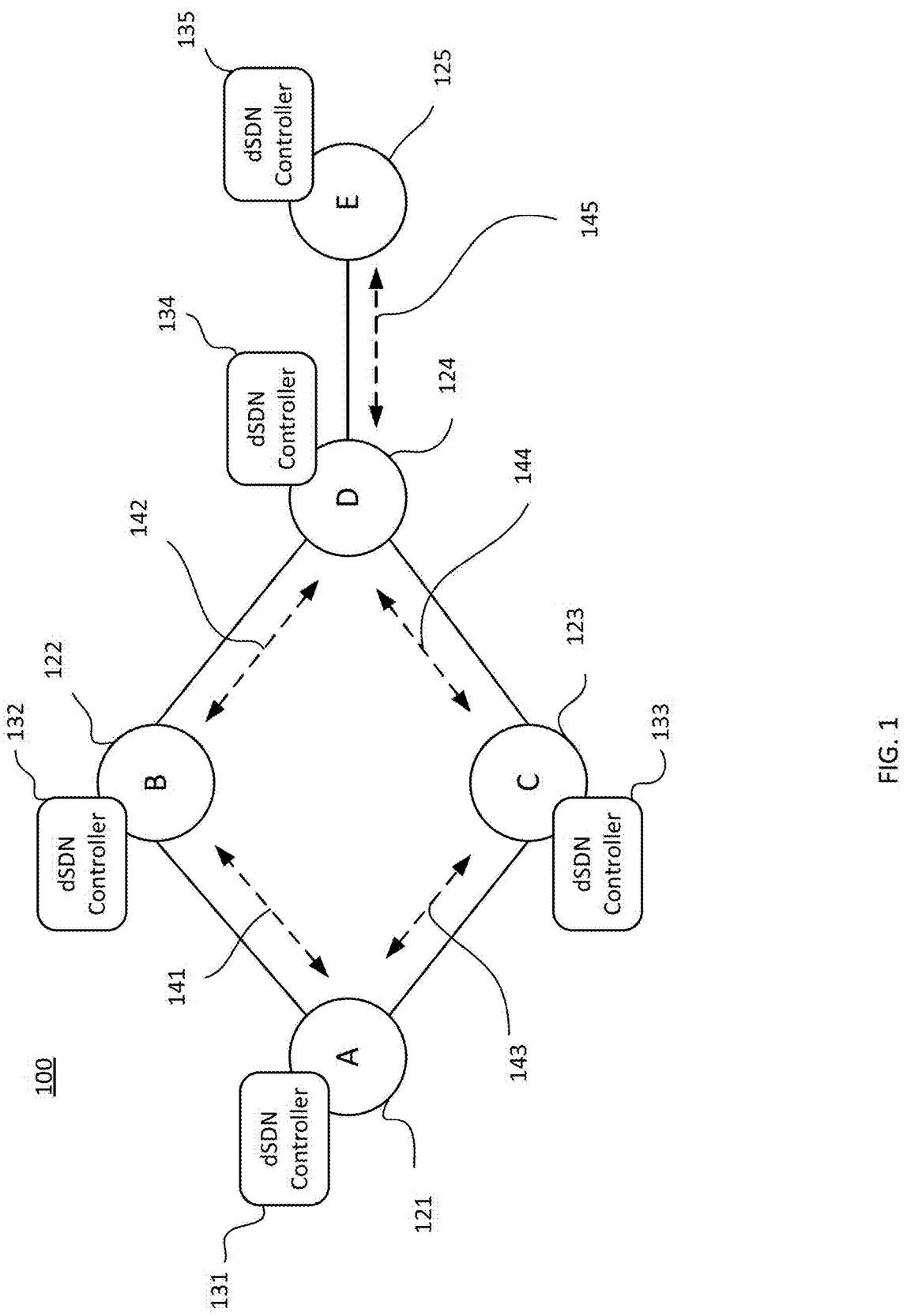
FIG. 1 is a node diagram illustrating an example dSDN architecture according to aspects of the disclosure.

FIG. 1 illustrates an example dSDN architecture. Example network 100 includes a plurality of nodes 121-125. Each node 121-125 may be a router, where each router runs a dSDN controller 131-135. For example, node 121 runs dSDN controller 131, node 122 runs dSDN controller 132, node 123 runs dSDN controller 133, node 124 runs dSDN controller 134, node 125 runs dSDN controller 135, etc. Each of the dSDN controllers 131-135 may maintain a global network state over which it computes end-to-end paths. The nodes 121-125 may use strict source routing to forward packets along these paths. In dSDN, a head-end router places the source route in the packet's header and the packet is forwarded through the network based on this source route.

dSDN may operate within a single domain or in multiple domains. In a single domain, every router node 121-125 in the network 100 floods its local status to all other nodes. For example, the nodes 121-125 may share status using an inter-node communication protocol, represented by arrows 141-145. By way of example, node 121 may share its status with nodes 122 and 123 via arrows 141, 143, respectively. Nodes 122 and 123 may share their own statuses as well as the status of node 121 with the node 124, etc. Every node thus discovers the global topology graph.

Having discovered the global topology graph, each node 121-125 may locally compute end-to-end paths based on some policy, such as k-shortest, k-disjoint, geo-constrained, demand-aware traffic engineering, etc. Packets may be routed based on a strict source route that is added to a packet's header at the ingress/head-end router. If the packet encounters a failure or congestion, the packet's source route can be changed to a new one, subject to certain constraints for avoiding loops. The above process involves steps at both the control plane and data plane.

At the control plane, a node may implement control operations. Some example control operations include: sending node state (NS) updates to all other nodes; processing the NS updates it receives from other nodes to construct the topology graph; and processing the graph to compute policy-compliant routes. A node state update captures a node's local status including, but not limited to, its identifier, its neighbors, link status, link load and capacity, local destination prefixes, etc. Each node builds an entire topology graph from the NS updates that it receives and then computes paths by processing its local copy of the topology graph, based on some policy. Policies might range from simple default policies to more advanced policies. The paths computed may be programmed into forwarding hardware at the local router, such as in the form of <destination, source-route> entries.

Many implementations of the above control plane approach are possible. One option is to implement the above logic in a container that runs on the router's control CPU and use an open source remote procedure call (gRPC) routing information base interface (gRIBI) application programming interface (API) to program the forwarding hardware.

At the data plane, forwarding a packet in dSDN begins at a head-end router or other router where dSDN. The head-end router, or other router where forwarding begins, maps the packet's destination IP address to its associated source route. Where multiple source-routes exist, a load-balancing policy determines how flows are balanced across the multiple available source-routes. Different load-balancing policies are possible, such as hash-based, capacity-aware, class-based load-balancing, or any combination of these or other policies.

A packet in dSDN is forwarded based on a next-hop in its source route. If the next hop in the packet's source route is unavailable, the node may replace the source route with a different one that uses an available neighbor. Loops involving multiple source routes may be avoided in one or more ways. For example, a source-route can be replaced, whereby loop avoidance is achieved by comparing a current source-route against a replacement one. As another example, an identifier of the failed link can be added to the packet header, and any new source route should avoid all failed links enumerated in the header.

Many implementations of the data plane operations described above are possible. One option is to encode source routes using MPLS and its associated techniques. Another is to leverage emerging programmable switch hardware and languages like P4 to define a custom header format for dSDN.

The operations described above with respect to a single domain can also be extended for operation in a network composed of multiple domains. Each router 121-125 may be associated with a domain attribute that identifies the domain it belongs to. For example, a router may be supplied with a specific domain identifier via configuration along with its node identifier, or the value may be encoded into the dSDN controller software for a device statically. Some nodes may be configured with multiple domain identifiers to indicate that they participate into two domains of the network. Each domain may generate a domain state update that is propagated to all nodes in the network. This domain state update may be similar to the node state update described above, but at the domain level. For example, a domain state update may include a domain identifier, prefixes that originate within that domain, neighboring domain identifiers, etc. The domain state update may be constructed from node state updates of all routers in the domain. Any router in the domain may be capable of constructing a domain state update for its domain. In some examples, only a router with a lowest node identifier within its domain will construct the domain state update and advertise it to its neighboring routers.

Routers receiving node state updates from nodes within their domain may forward such node state updates to other nodes in their domain. Moreover, routers receiving domain state updates, from nodes within their domain or from nodes in another domain, may forward such domain state updates. However, node state updates received from nodes outside of the receiving router's domain may be ignored by the receiving router and/or not forwarded to other routers. By way of example only, if node 124 is within a first domain and node 125 is within a second domain, node 124 may forward domain state updates from the node 125 but not node state updates from the node 125. However, if node 122 is in the first domain along with node 124, node 124 may forward node state updates from node 122 to other nodes in the first domain.

In view of the update process described above, every router in the network discovers its own intra-domain topology and state, as well as the complete inter-domain topology and state. A packet's source route is extended to include both an inter-domain path and an intra-domain path. The intra-domain path may be replaced on ingress to a new domain.

Figure 2:
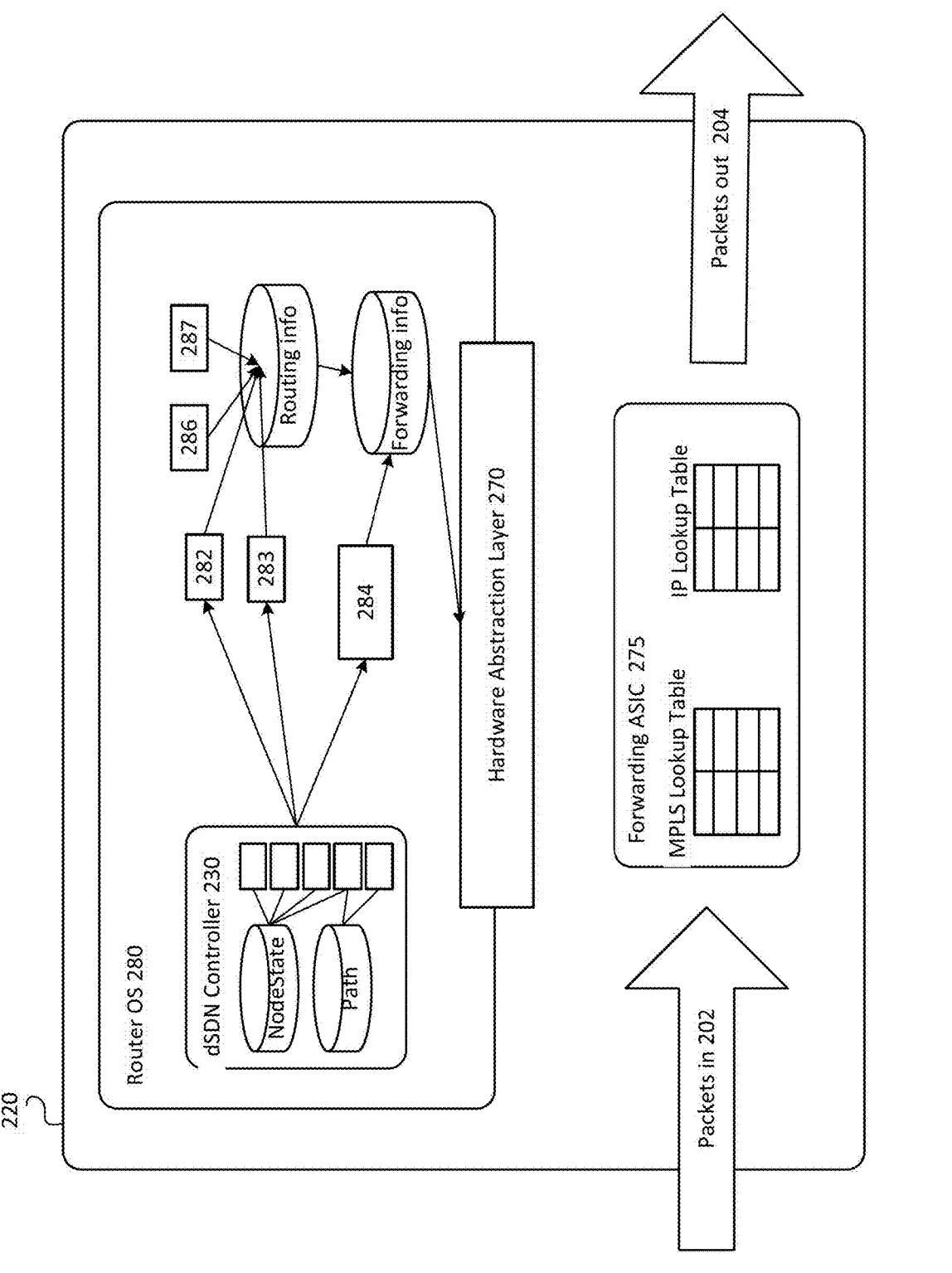
FIG. 2 is a block diagram illustrating an example router in the dSDN architecture according to aspects of the disclosure.

FIG. 2 illustrates an example dSDN router 200. The dSDN router 200 may include an operating system 280 that interfaces with hardware through an interface, such as hardware abstraction layer 270. The hardware may include a routing device for forwarding packets, such as forwarding unit 275.

dSDN controller 230 may be programmed in the operating system of the router 200. For example, dSDN controller 230 may be an application that manages flow placement. It may be run on one or more processors at the router 200. According to some examples, the dSDN controller may be run in a virtual machine, container, or the like. The dSDN controller 230 may keep track of node state of the router 200 and/or other nodes within the network. For example, the controller 230 may store the node states within a database. The dSDN controller 230 may also keep track of end-to-end paths computed in the network. For example, the dSDN controller 230 may store such paths in a database, which may be the same or separate from the database storing the node states.

The dSDN controller 230 may interface with a routing information base and/or a forwarding information base through one or more interfaces 282, 283, 284. Such interfaces may include, for example, gRIBI, P4Runtime, or any of a variety of other interfaces. One or more companion protocols 286, 287 may be utilized by the routing information base. Examples of such protocols 286, 287 may include interior gateway protocols, such as intermediate system to intermediate system (IS-IS), and/or exterior gateway protocols, such as border gateway protocol (BGP). While these are merely some examples, it should be understood that any of a variety of other protocols may be utilized.

The hardware abstraction layer 270 may provide an interface between the router operating system 280 and the forwarding unit 275. The forwarding unit 275 may be, for example, an application specific integrated circuit (ASIC), a microprocessor, a field programmable gate array (FPGA), etc. The forwarding unit 275 may receive incoming packets 202 and output outgoing packets 204. For example, the forwarding unit 275 may include one or more routing tables for determining how the incoming packets 202 should be routed, such as which port the packets should be sent through or to which other router the outgoing packets 204 should be sent.

Figure 3:
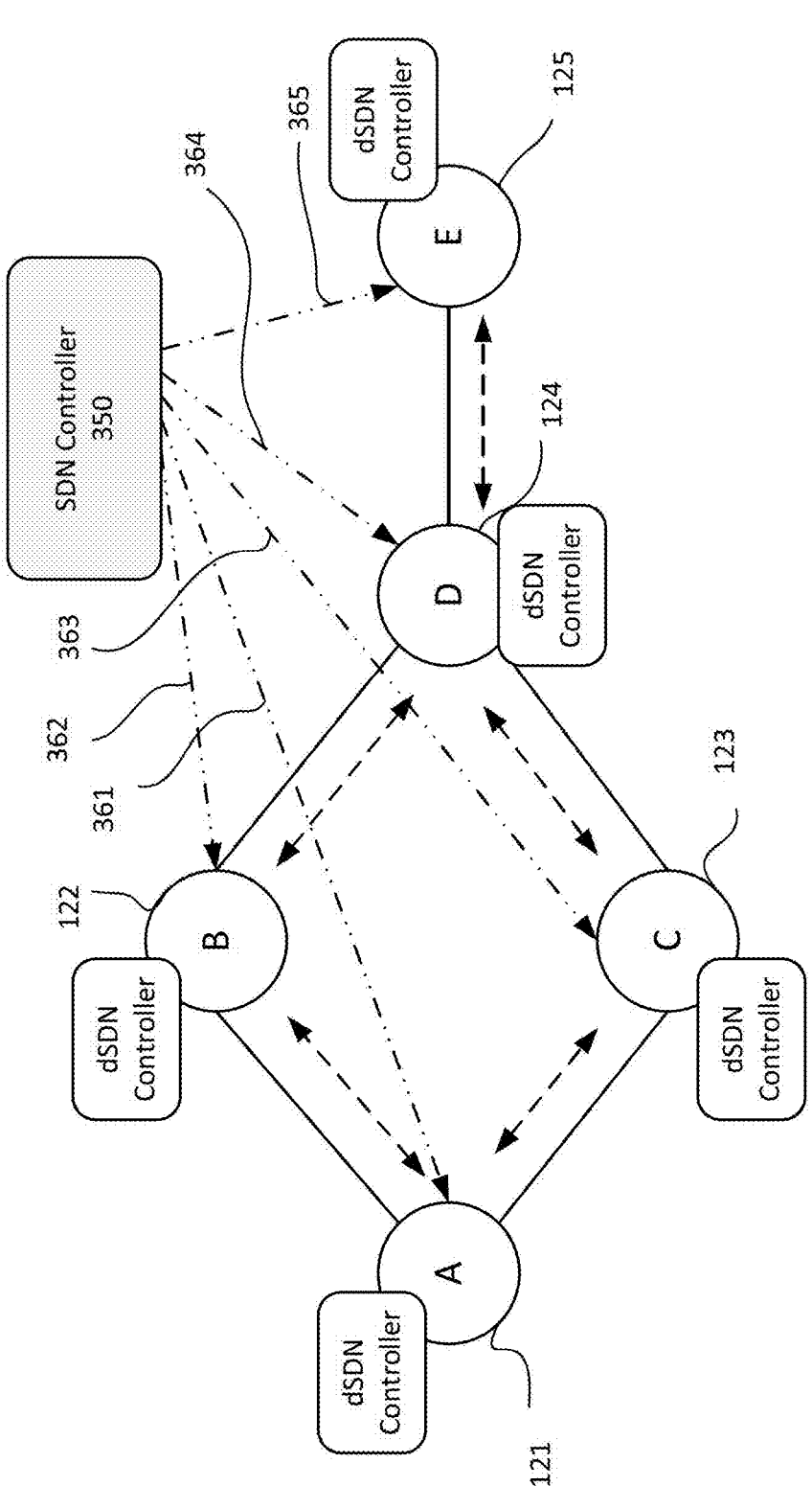
FIG. 3 is a node diagram illustrating an example unified network architecture with SDN overlay and dSDN underlay, according to aspects of the disclosure.

FIG. 3 illustrates an example unified network architecture 300 with a dSDN underlay and a SDN overlay. The dSDN underlay may have the same architecture as the network 100 of FIG. 1. The overlay may be based on SDN architecture. For example, SDN controller 350 may be logically centralized. The SDN controller 350 may compute end-to-end paths based on a global view of the network's state. The SDN controller 350 may directly program these paths at each router via a control plane network, as represented by arrows 361-365. The underlay may compute paths via traditional routing protocols run at each node, or as described above in connection with FIG. 1. The paths computed by the overlay's SDN controller 350 may serve as primary paths, while the paths computed by the underlay may serve as fallback paths, such as if the primary paths become unavailable.

The SDN controller 350 may be, for example, an application in the SDN architecture that manages flow placement. For example, the SDN controller 350 may be a software system or collection of systems that together provides management of network state, a high-level data model that captures the relationships between managed resources, policies and other services provided by the controller, an API that exposes controller services to an application, etc. In some examples, the SDN controller may further provide a secure TCP control session between itself and the nodes 121-125 in the network. The SDN controller 350 may run on a server and may direct traffic according to one or more forwarding policies. An interface or protocol allows the SDN controller 350 to communicate with other devices in the network.

The nodes 121-125 may each run a dSDN controller that maintains global network state over which it computes end-to-end paths and uses strict source routing to forward packets along these paths. For example, a head-end router places the source route in the packet's header and the packet is forwarded through the network based on the source route.

The architecture 300 provides a unified approach to path computation in the overlay and underlay. In both the overlay and underlay, path computation is based on global state. For example, the global state may be derived from a complete view of a network connectivity graph and traffic demands. In both the overlay and underlay, in the absence of failures, the end-to-end path that a packet takes is determined by a localized computation that is run at a single node. The SDN control 250 runs the computation in the overlay and the head-end router may run the computation in the dSDN underlay.

Figure 4A:
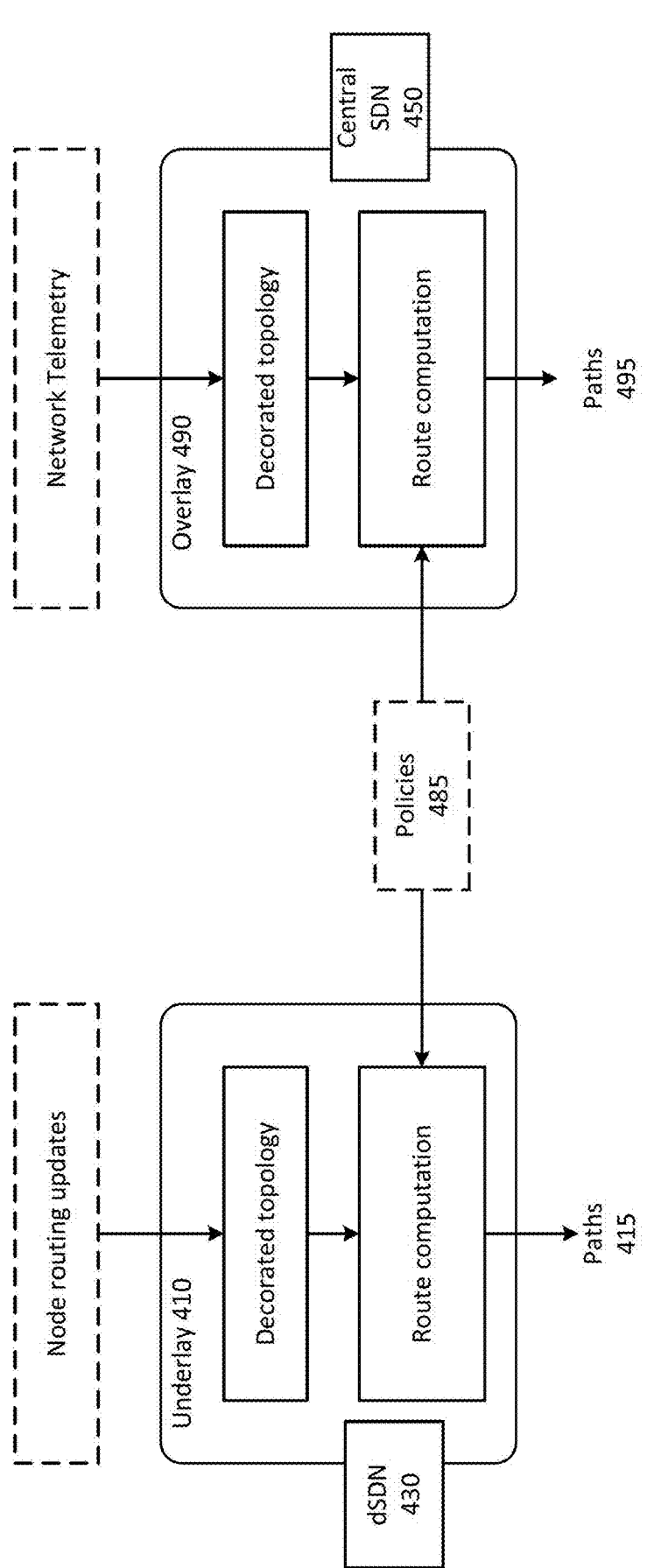
FIG. 4A is a block diagram illustrating operation of the example unified architecture for path computation according to aspects of the disclosure.

FIG. 4A illustrates another example of the unified architecture of FIG. 3. As shown, underlay 410 and overlay 490 each determine a topology of the network and perform route computations. The underlay 410 uses node routing updates to determine the topology and uses the dSDN controller 430 to perform route computations. The overlay 490 uses network telemetry to determine the network topology and uses centralized SDN controller 450 to perform the route computations. The paths 415 computed by the underlay 410 and the paths 495 computed by the overlay 490 may be computed using the same policies 485.

Given identical policies and input state, the centralized SDN controller 450 should output the same path as the decentralized SDN controller 430. However, while architecturally similar, the underlay 410 and overlay 490 use different implementations. For example, the underlay 410 and overlay 490 may collect the input network state in different manners. The centralized SDN controller 450 collects network state over a control plane network, while the dSDN controller 430 that runs at each router discovers the network state by listening to per-router advertisements that are propagated inband through network fabric. As another example, path computation at the SDN controller 450 may be based on a different codebase from that used in dSDN. As another example, hardware systems running on the SDN controller 450 may be different and independent from those running on the dSDN controller 430.

In effect, the central SDN controller 450 and the dSDN controller 430 may be independent implementations of the same path computation logic. Under identical rules or policies for path computation and identical input state, the paths 415 computed by the underlay 410 should exactly match the paths 495 computed by the overlay 490. Moreover, since the two are independent implementations, a probability that they each implement the same bugs is reduced.

Error detection may be performed by comparing outputs computed by the overlay's SDN controller 450 with the outputs computed by each dSDN controller 430. The outputs may be compared in any of a variety of ways.

In one example of comparing outputs, the SDN controller 450 can share the paths 495 it computes with the dSDN controller at each router. Each router can then compare the paths 415 it has computed locally against those shared by the overlay's SDN controller 450 and can flag any discrepancies as a potential error.

Figure 4B:
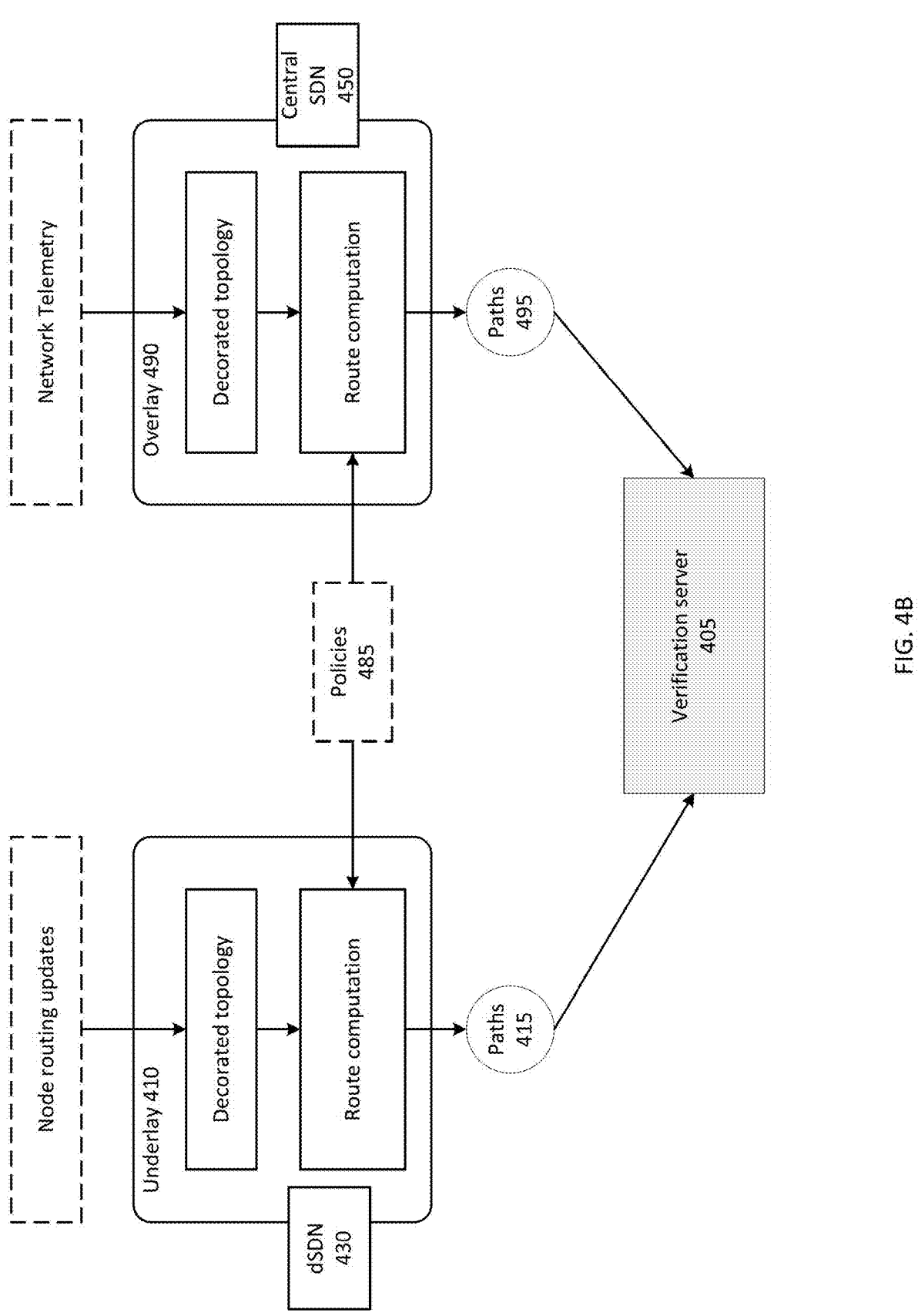
FIG. 4B is a block diagram illustrating another example of the unified architecture for path computation according to aspects of the disclosure.

FIG. 4B illustrates another example of comparing outputs. In this example, the SDN controller 450 and each dSDN controller may report the paths they compute to a central verification server 405. The verification server 405 may compare the paths computed by each controller and flag any discrepancies as a potential error. Discrepancies may be flagged directly to network management systems through exported node telemetry, by device logging (syslog), or other management plane interfaces.

In any method of comparing outputs, discrepancies can be defined differently for different networks. For example, one network may be programmed such that any path comparison that does not result in an exact match will be flagged as a discrepancy. Another network may be programmed to tolerate path mismatches within a threshold. For example, a discrepancy will not be flagged unless the paths differ by more than some configurable threshold.

The checking process may iterate through all paths, comparing the dSDN output with the centralized SDN output. In some examples, validation can be implemented by a standalone server that attaches to the network, listens to routing control messages, and recreates the same network state as a router node would. The server can run the overlay and/or underlay control stack over the network state and thereby detect and triage errors in the control stack vs. the input state discovery process.

Figure 5:
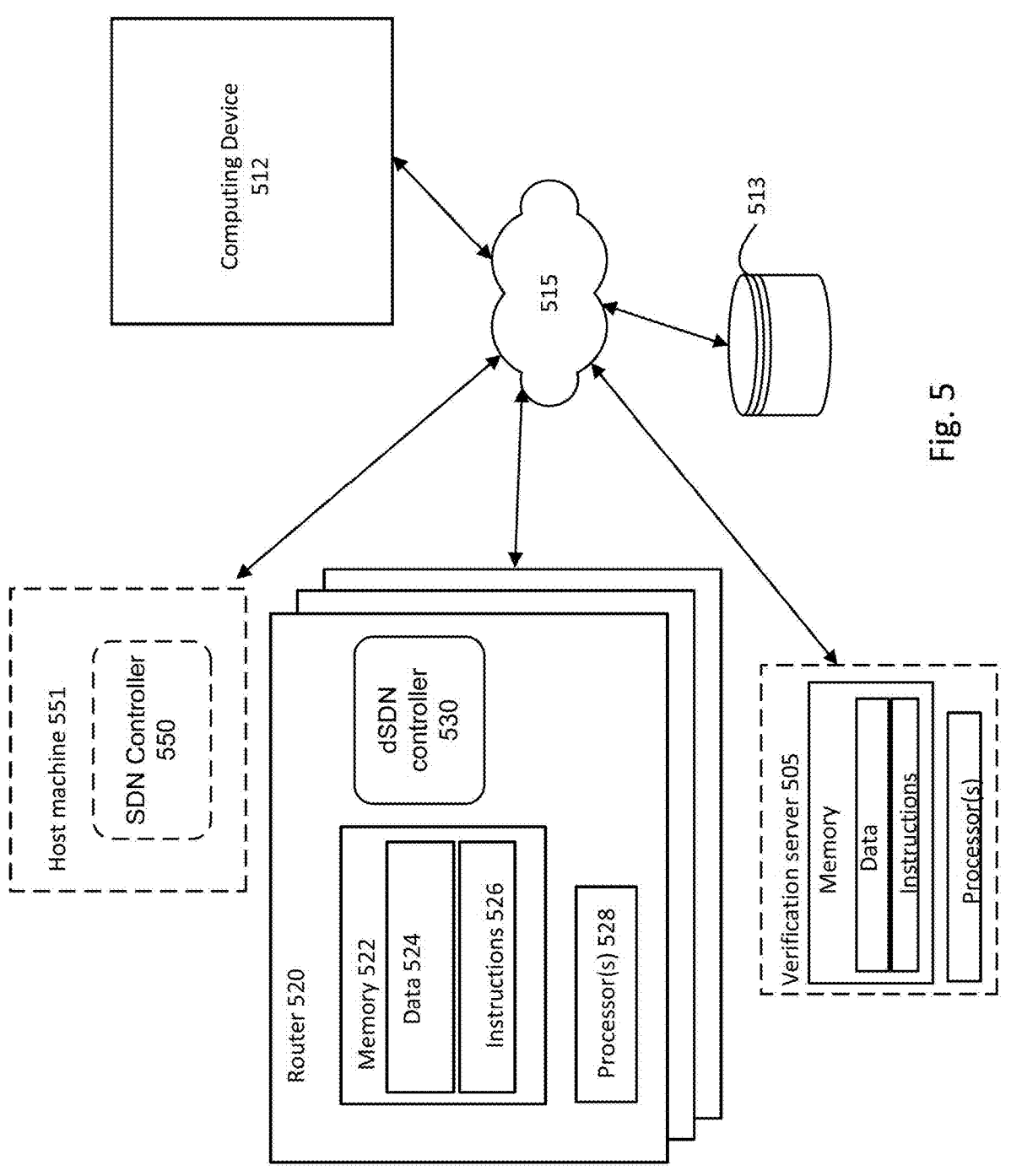
FIG. 5 is a block diagram illustrating an example hardware environment according to aspects of the disclosure.

FIG. 5 is a block diagram of an example environment for implementing the system described above. The system can be implemented on one or more devices having one or more processors in one or more locations. For example, as shown a plurality of routers 520 may communicate with other devices, such as over a network 515. Other devices may include a client computing device 512. In some examples, such as a unified network architecture with a dSDN underlay and SDN overlay, the other devices, such as host machine 551, may also host a SDN controller 550. Further examples may also include a verification server 505, such as for comparing routes independently computed by the underlay and overlay.

The computing devices may also be coupled to one or more storage devices 513, and/or any of a variety of other types of devices, over the network 515. The storage device (s) 513 can be a combination of volatile and non-volatile memory, and can be at the same or different physical locations than the computing devices. For example, the storage device(s) 513 can include any type of non-transitory computer readable medium capable of storing information, such as a hard-drive, solid state drive, tape drive, optical storage, memory card, ROM, RAM, DVD, CD-ROM, write-capable, and read-only memories.

Each router 520 can include one or more processors, memory, and a dSDN controller 530. Memory 522 can store information accessible by the processor(s) 528, including instructions 526 that can be executed by the processor(s) 528. The memory 522 can also include data 524 that can be retrieved, manipulated or stored by the processor(s) 528. The memory 522 can be a type of non-transitory computer readable medium capable of storing information accessible by the processor(s) 528, such as volatile and non-volatile memory. The processor(s) 528 can include one or more central processing units (CPUs), graphic processing units (GPUs), field-programmable gate arrays (FPGAs), and/or application-specific integrated circuits (ASICs), such as tensor processing units (TPUs).

The instructions 526 can include one or more instructions that when executed by the processor(s) 528, cause the one or more processors to perform actions defined by the instructions. The instructions 526 can be stored in object code format for direct processing by the processor(s) 528, or in other formats including interpretable scripts or collections of independent source code modules that are interpreted on demand or compiled in advance. The instructions 526 can include instructions for implementing the system consistent with aspects of this disclosure.

The data 524 can be retrieved, stored, or modified by the processor(s) 398 in accordance with the instructions 526. The data 524 can be stored in computer registers, in a relational or non-relational database as a table having a plurality of different fields and records, or as JSON, YAML, proto, or XML documents. The data 524 can also be formatted in a computer-readable format such as, but not limited to, binary values, ASCII or Unicode. Moreover, the data 524 can include information sufficient to identify relevant information, such as numbers, descriptive text, proprietary codes, pointers, references to data stored in other memories, including other network locations, or information that is used by a function to calculate relevant data.

Although FIG. 5 illustrates the processors 528 and the memory 522 as being within the router 520, the processors 528 and the memories 522 can include multiple processors and memories that can operate in different physical housings and/or locations. For example, some of the instructions 526 and the data 524 can be stored on a removable SD card and others within a read-only computer chip. Some or all of the instructions and data can be stored in a location physically remote from, yet still accessible by, the processors 528. Similarly, the processors 528 can include a collection of processors that can perform concurrent and/or sequential operation.

The computing device 512 can also include one or more processors, memory, and other components. Host machine 551 may similarly include memory, processors, and other components. The host machine 551 may also implement SDN controller 550, such as in a virtualized environment. The verification server may also include memory, data, instructions, and one or more processors. While the different devices may include structurally similar components such as processors and memories, they may each execute different instructions to perform different operations.

The devices can set up listening sockets that may accept an initiating connection for sending and receiving information. The network 515 itself can include various configurations and protocols including the Internet, World Wide Web, intranets, virtual private networks, wide area networks, local networks, and private networks using communication protocols proprietary to one or more companies. The network 515 can support a variety of short- and long-range connections. The short- and long-range connections may be made over different bandwidths, such as 2.402 GHz to 2.480 GHz 2.4 GHz and 5 GHz, or with a variety of communication standards, such as standards for wireless broadband communication. The network 515, additionally or alternatively, can also support wired connections between the devices, including over various types of Ethernet connection.

The systems described above may be used to perform methods related to route computation and routing. Several examples of such methods are described below. While operations of such methods are described in a particular order, the order may be modified. In some examples, operations may be performed in parallel. In some examples, operations may be added or omitted.

Figure 6:
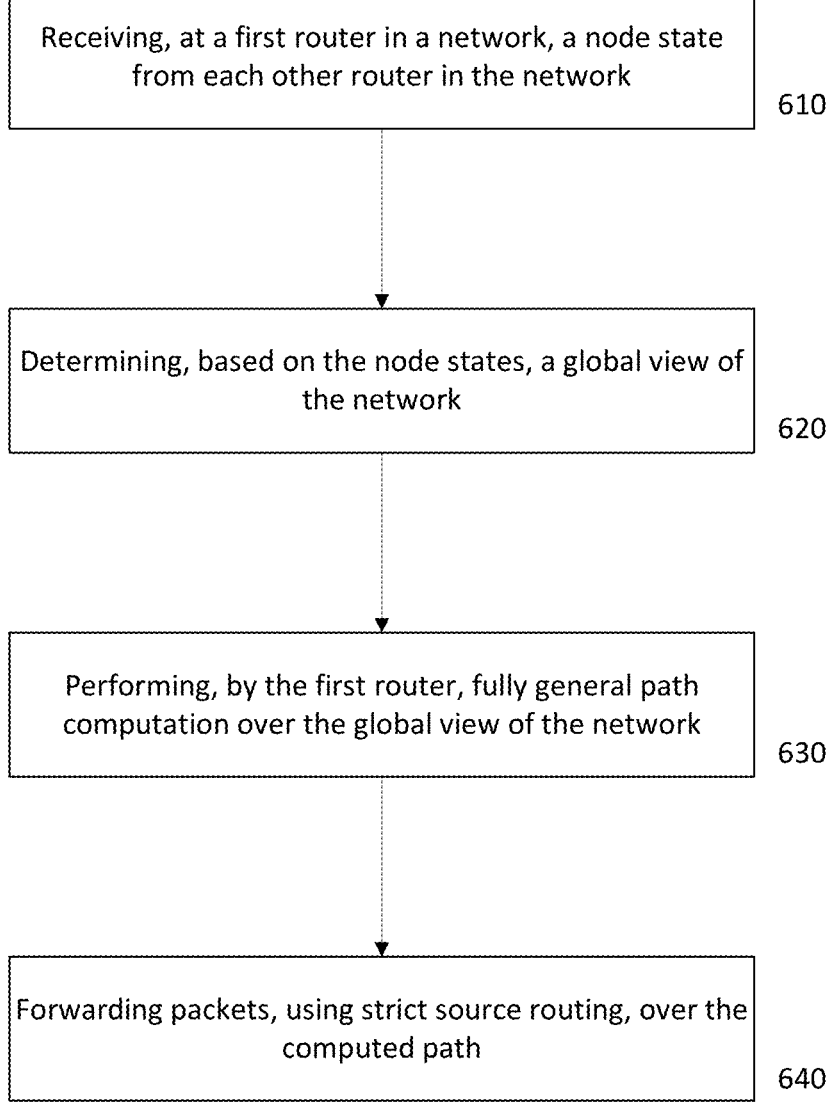
FIG. 6 is a flow diagram illustrating an example method of packet forwarding in a single domain dSDN network according to aspects of the disclosure.

FIG. 6 illustrates an example method 600 of routing in a decentralized software defined network (dSDN) having a plurality of routers, each router having a dSDN controller.

In block 610, a first router receives a node state from each other router in the network. The network may be a single domain network. The node state may be an update including the node's local status. Such status may include, for example, its identifier, neighbors, link status, link load, capacity, local destination prefixes, etc. While these are a few examples of node state information, the node state update may include any combination of these or other types of node information. The node states of each node may be propagated through the network, such as by using network telemetry.

In block 620, the first router may determine a global view of the network based on the received node states. For example, the first router may construct a topology graph of the network.

In block 630, the first router may perform fully general path computation over the global view of the network. For example, the first router may compute policy-compliant routes based on the topology graph. The paths may be end-to-end paths between a source and a destination. According to some examples, the computed paths may be programmed into forwarding hardware at the first router.

In block 640, the first router forwards packets over the computed path using strict source routing. In forwarding the packet, the first router may map the packet's destination IP address to its associated source route. If there are multiple source routes, flows may be balanced among the multiple source routes, such as by using a load-balancing protocol.

Figure 7:
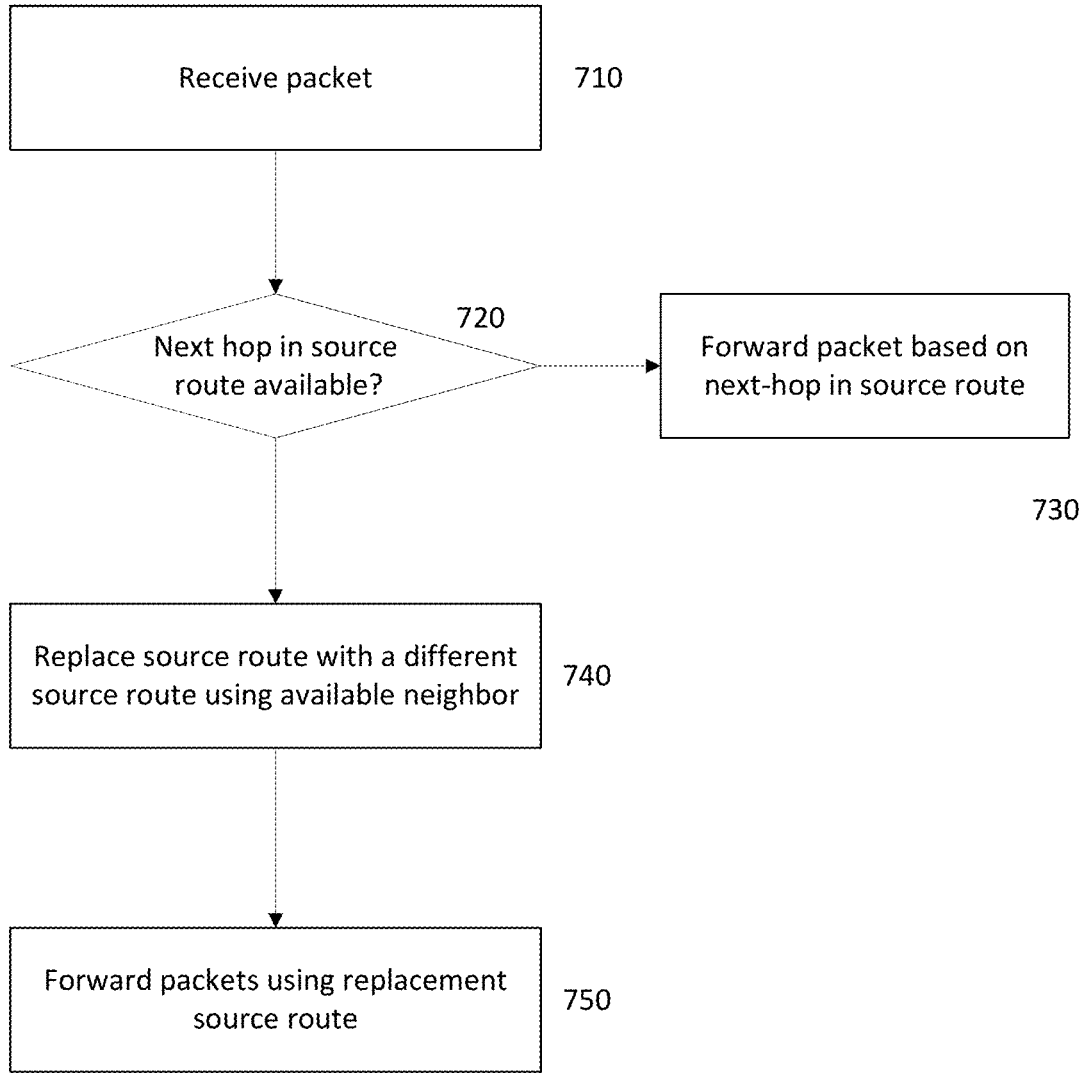
FIG. 7 is a flow diagram illustrating another example method of packet forwarding in the dSDN network according to aspects of the disclosure.

FIG. 7 illustrates an example of forwarding packets through the network. In block 710, a router receives the packet. The router may determine in block 720 whether the next hop in the source route is available. For example, the next hop may be unavailable if the next-hop router identified in the source route has failed, or if a link between the router and the next-hop router has failed. If the next hop is unavailable, the router forwards the packet based on the next hop in the source route in block 730. If the next hop is not available, the router may replace the source route with a different source route using an available neighbor. Loops can be avoided by adding an identifier of the unavailable next-hop router or the failed to the packet header, where any new source route must avoid all failed nodes/links enumerated in the header. In another example, loops can be avoided by restricting replacement of the source route to once per packet.

FIG. 8 illustrates an example of forwarding packets through a multi-domain dSDN network, where each router in each domain includes a dSDN controller.

In block 810, a first router in a first domain receives a node state from each other router in the first domain. For example, node state updates may be propagated through each respective domain, such as described above in connection with FIG. 6. If the first router receives a node state update from another router in a different domain, the first router may ignore the node state update.

In block 820, the first router in the first domain generates a domain state updated based on all the node states received from the other routers in the first domain. The domain state update may include, for example, a domain identifier, prefixes that originate within the domain, neighboring domain identifiers, or any combination of these or other types of information.

In block 830, the domain state is propagated to all nodes, in all domains, of the network. The first router in the first domain may thus receive a domain state update from a second router in a second domain in block 840. If there are additional domains in the network, the first router may further receive domain state updates from each additional domain in the network.

In block 850, the first router determines a global view of the network based on the node states in the first domain and the domain state in each other domain. In block 860, the first router may perform fully general path computations over the global view of the network. This may be similar to the path computation described in connection with FIG. 6 above, but the source route is extended to include both inter-domain paths and intra-domain paths.

In block 870, the first router forwards packets over the computed path using strict source routing. According to some examples, when receiving packets from a different domain, the first router may replace the intra-domain paths from the different domain with intra-domain paths of the first domain.

Figure 9:
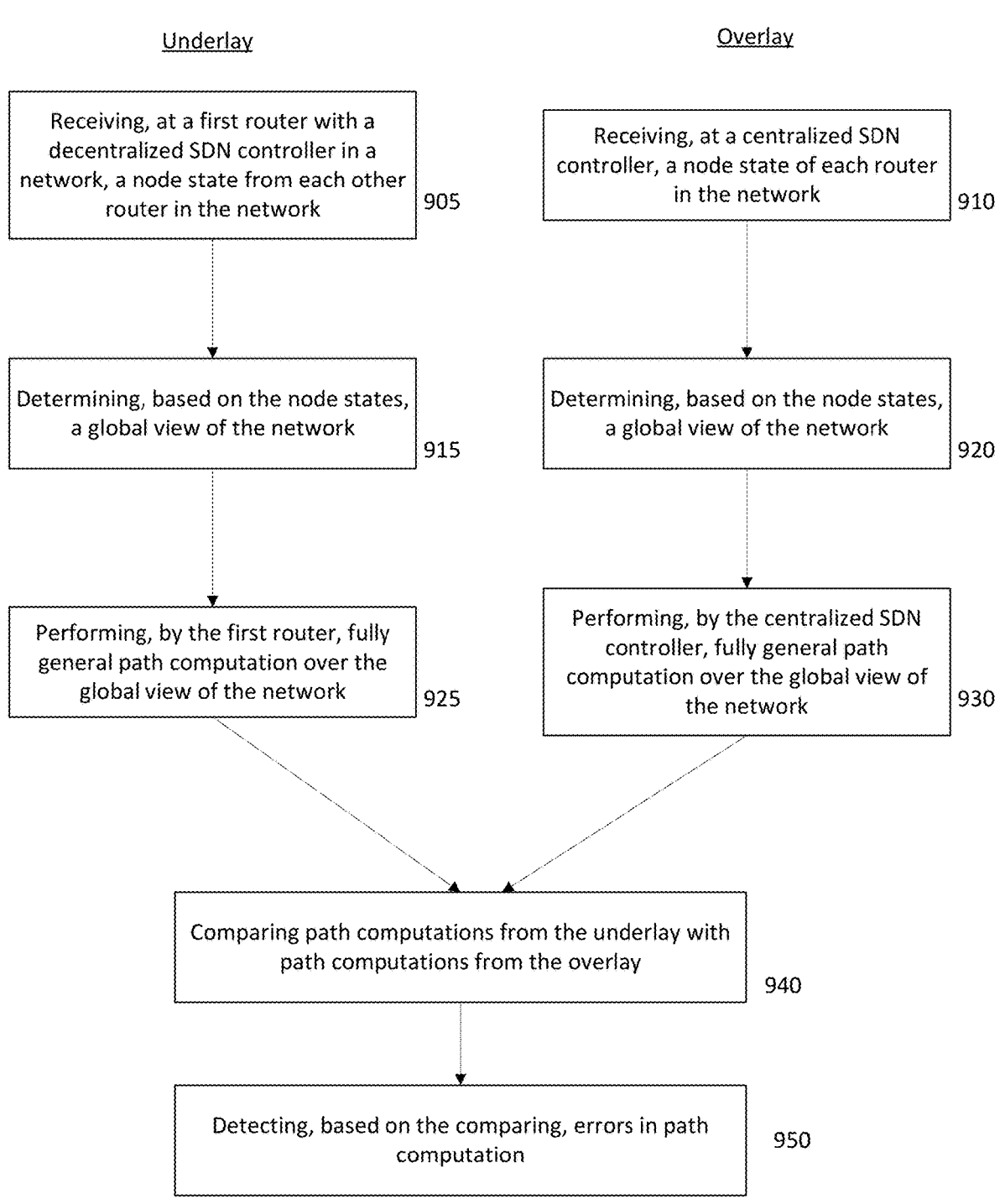
FIG. 9 is a flow diagram illustrating an example method of detecting path computation errors in a unified network architecture according to aspects of the disclosure.

FIG. 9 illustrates an example method 900 of detecting path computation errors in a network having a dSDN underlay with SDN overlay. Each router in the network may include a respective dSDN controller. In addition, a centralized SDN controller may communicate with each router in the overlay.

At the underlay, in block 905, a first router receives a node state from each other router in the network. In block 915, the first router determines a global view of the network based on the node states. In block 925, the first router performs fully general path computations over the global view of the network. The operations in blocks 905, 915, 925 may be similar to those described above in connection with FIGS. 6 and 8.

At the overlay, in block 910, the centralized SDN controller receives a node state of each router in the network. In block 920, the centralized SDN controller determines a global view of the network based on the node states. In block 930, the centralized SDN controller performs fully general path computation over the global view of the network.

In block 940, paths computed in each of the underlay and the overlay are compared. For example, the paths may be sent to one of the routers for comparison, or they may be sent to the centralized SDN controller for comparison. In other examples, the paths may be sent to an independent server or other processing device for the comparison.

In block 950, errors in the path computations are detected. For example, if there is a degree of mismatch between the paths computed in the underlay and the paths computed in the overlay, it may be determined that an error exists. The degree of mismatch can be tuned. For example, the degree of mismatch may be set close to 0, such that anything other than an exact match is determined to be an error. In other examples, the degree of mismatch may be set to some non-zero threshold, such that some minor degree of path mismatch may be permitted. If path errors are detected, the paths may be flagged for inspection and correction.

The systems and methods described above are beneficial in numerous respects. The dSDN's use of strict source routing results in greater efficiency, as it is not necessary to program the path at each router along the path. Rather, validating the path at the router that inserts the source route is sufficient. Moreover, since the end-to-end path is known at individual routers, as opposed to being distributed across multiple routers, there is no need for a global snapshotting process or any other form of coordination across routers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
a plurality of routers in a network, each router having a decentralized software-defined networking (dSDN) controller, wherein at least a first router of the plurality of routers is configured to:
receive, at a first dSDN controller of the first router, a node state from each other router in the plurality of routers in the network, the node state comprising information of the status of routers of the plurality of routers adjacent the first router;
determine, by the first dSDN controller of the first router based on the received node state from each other router, a global view of the network;
compute, by the first dSDN controller of the first router, a first set of end-to-end paths over the global view of the network;
perform, by the first dSDN controller of the first router, a runtime validation of the first set of end-to-end paths to detect errors in the network state; and
forward, by the first dSDN controller of the first router, packets using strict source routing over the first set of end-to-end paths.

2. The system of claim 1, further comprising a centralized software-defined networking (SDN) controller in an overlay of the network, the centralized SDN controller in communication with each of the plurality of routers in the network.

3. The system of claim 2, wherein the centralized SDN controller is configured to compute a second set of end-to-end paths over the network.

4. The system of claim 3, wherein the first dSDN controller of the first router is configured to:

compare the first set of end-to-end paths with the second set of end-to-end paths; and determine, based on the comparing, whether errors exist in the first or second set of end-to-end paths.

5. The system of claim 3, further comprising a verification server configured to:

receive the first set of end-to-end paths from the first router;

receive the second set of end-to-end paths from the centralized SDN controller;

compare the first set of end-to-end paths with the second set of end-to-end paths; and determine, based on the comparing, whether errors exist in the first or second set of end-to-end paths.

6. The system of claim 1, wherein the network is a multi-domain network wherein the first router is in the first domain and a second plurality of routers is in the second domain, wherein the first router is further configured to:

generate a first domain state based on the node states from each other router; and provide the first domain state to at least one second router in the second plurality of routers in the second domain.

7. The system of claim 6, wherein the first router is further configured to:

receive a second domain state from the second domain; and generate a global network state based on the node states from the first domain and the second domain state from the second domain;

wherein the first set of end-to-end paths includes inter-domain links.

8. The system of claim 1, wherein in forwarding packets using strict source routing over the first set of end-to-end paths the first router is further configured to:

determine whether a next-hop in a source route is unavailable; and replace the source route with a different source route using an available neighbor.

9. The system of claim 1, wherein determining the global view of the network comprises constructing a topology graph using the node states.

10. The system of claim 9, wherein computing the first set of end-to-end paths comprises processing the topology graph to compute routes that are compliant with one or more policies.

11. A method of routing among a plurality of routers in a network, each router having a decentralized software-defined networking (dSDN) controller, the method comprising:

receiving, at a first router of the plurality of routers, a node state from each other router in the plurality of routers in the network, the node state comprising information of the status of routers of the plurality of routers adjacent the first router;

determining, by a first dSDN controller of the first router based on the received node state from each other router, a global view of the network;

computing, by the first dSDN controller of the first router, a first set of end-to-end paths over the global view of the network;

performing, by the first dSDN controller of the first router, a runtime validation of the first set of end-to-end paths to detect errors in the network state; and forwarding, by the first dSDN controller of the first router, packets using strict source routing over the first set of end-to-end paths.

12. The method of claim 11, further comprising determining, by a centralized software-defined networking (SDN) controller in an overlay of the network, a topology of the network.

13. The method of claim 12, further comprising computing, by the centralized SDN controller, a second set of end-to-end paths over the network.

14. The method of claim 13, further comprising:

comparing, by the first dSDN controller of the first router, the first set of end-to-end paths with the second set of end-to-end paths; and determining, based on the comparing, whether errors exist in the first or second set of end-to-end paths.

15. The method of claim 13, further comprising:

receiving, at a verification server, the first set of end-to-end paths from the first router;

receiving, at the verification server, the second set of end-to-end paths from the centralized SDN controller;

comparing, at the verification server, the first set of end-to-end paths with the second set of end-to-end paths; and determining, at the verification server based on the comparing whether errors exist in the first or second set of end-to-end paths.

16. The method of claim 11, wherein the network is a multi-domain network wherein the first router is in the first domain and a second plurality of routers is in the second domain, further comprising:

generating, by the first router in the first domain, a first domain state based on the node states from each other router; and providing the first domain state to at least one second router in the second plurality of routers in the second domain.

17. The method of claim 16, further comprising:

receiving, by the first router in the first domain, a second domain state from the second domain; and generating a global network state based on the node states from the first domain and the second domain state from the second domain;

wherein the first set of end-to-end paths includes inter-domain links.

18. The method of claim 11, wherein forwarding packets using strict source routing over the first set of end-to-end paths comprises:

determining whether a next-hop in a source route is unavailable; and replacing the source route with a different source route using an available neighbor.

19. The method of claim 11, wherein determining the global view of the network comprises constructing a topology graph using the node states.

20. The method of claim 19, wherein computing the first set of end-to-end paths comprises processing the topology graph to compute routes that are complaint with one or more policies.

* * * * *